Dec. 24, 1940.  W. S. WEST  2,225,675

COMBINATION VALVE CAP AND TIRE GAUGE DEVICE

Filed Dec. 2, 1938

Inventor:
William S. West
By: Leslie W. Frieze
Attorney.

Patented Dec. 24, 1940

2,225,675

UNITED STATES PATENT OFFICE 2,225,675

COMBINATION VALVE CAP AND TIRE GAUGE DEVICE

William S. West, Chicago, Ill.

Application December 2, 1938, Serial No. 243,618

3 Claims. (Cl. 116—34)

My invention relates to combination valve cap and tire gauge devices and it has for its object the provision of a new and improved form and arrangement of parts in devices of this type whereby a driver of a motor vehicle having one of my improved devices on each of the tires can by a glance at the several devices determine quickly and easily whether pressure in the tires is normal or below normal.

To this end it is one of the objects of my invention to provide an improved device of the type specified adapted to be left in position on the valve stem in place of the ordinary cap and so arranged that regardless of the position of the wheel when it has come to rest, the condition of pressure in the tire can be ascertained at a glance without the necessity for manual manipulation of any of the parts.

It is another object of my invention to provide a device of this type which will weigh but little if any more than an ordinary valve cap and thus have a minimum effect of throwing the wheel out of balance when applied in place of the cap. To this end I have provided a device of this type which is of small size and is adapted to be constructed of light weight materials.

It is also an object of my invention to provide a device of this type which is of such small diameter as to be capable of being turned readily about its longitudinal axis for application to the threads of the valve stem of a tire.

It is a further object of my invention to provide a device of this type which may be constructed on a commercial scale at comparatively low cost. With this in view I have provided a device having but few parts all of which, excepting a spring, may be molded economically of suitable materials thereby avoiding machine or other costly finishing operations.

It is another object of my invention to provide a device of this type having a transparent zonal window completely therearound through which the movement of the indicating member of the device may be readily observed in any position of the device on the valve stem.

The invention consists in the novel and improved constructions, arrangements, and devices to be hereinafter described and claimed for carrying out the above stated objects and such other objects as will appear from the following specification of a certain preferred embodiment illustrated in the accompanying drawing, wherein—

Like characters of reference designate like parts in the several views.

Figure 1:
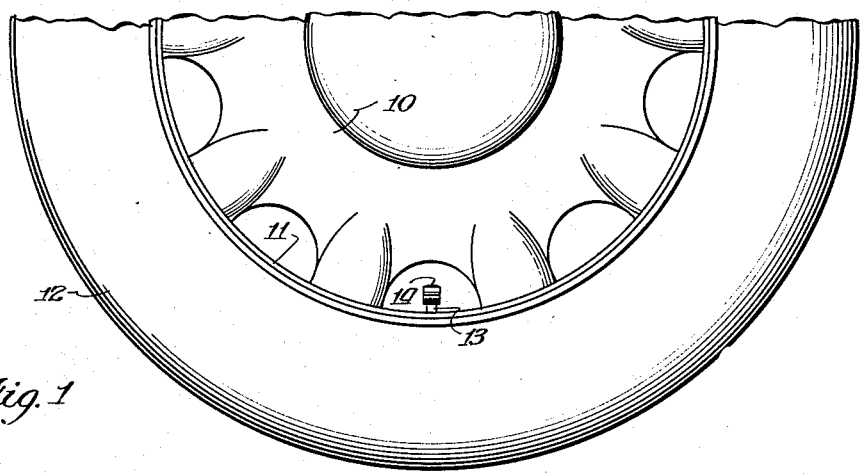
Fig. 1 is a side view of a portion of an automobile wheel and a tire in position thereon equipped with my improved device.
Figure 2:
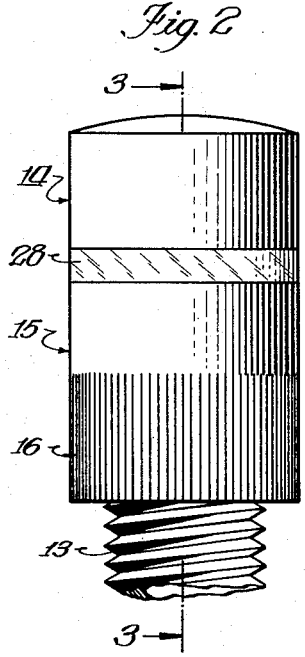
Fig. 2 is a side view on an enlarged scale of my improved device mounted on the valve stem of a tire.

Referring first to Fig. 1 of the drawing, a disc wheel of any approved type is shown at 10 and is provided with a rim 11 on which is mounted a pneumatic tire 12. On the valve stem 13 with which the tire 12 is equipped and which extends inwardly through the rim 11 is placed my improved combination valve cap and tire gauge device 14.

My improved device comprises a sleeve 15 of molded opaque plastic material which is provided with an exterior striated portion 16 and an internal threaded portion 17. The portion 17 is adapted to be threaded onto the valve stem 13. The sleeve 15 is also provided with an internal ledge 18 having a central perforation or opening 19 therethrough. Positioned on the ledge 18 is an imperforate flexible diaphragm 20 having a crown portion 21 and a rim portion 22. The diaphragm is constructed of a highly flexible material such as gum rubber and is of such thinness that it is easily foldable upon itself. The rim portion 22 is clamped tightly against the ledge 18 by a sleeve 23 of molded transparent plastic material which fits within the sleeve 15 and bears on the rim portion.

The sleeve 23 is provided with a ledge 24 having a central perforation or opening 25 therethrough. A cap member 26 of molded opaque plastic material fits over the transparent sleeve 23 and provides a chamber 27 above the diaphragm. The cap member 26 and the opaque sleeve 15 are separated by a narrow outwardly extending annular rib on the transparent sleeve 23 thereby providing a sight zone or window 28 entirely around the device through any portion of which a person may see into the chamber 27.

Figure 3:
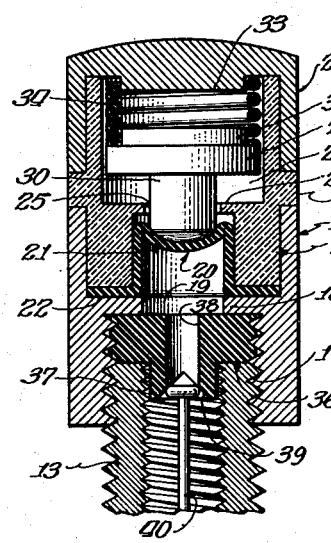
Fig. 3 is a sectional view taken on the line 3—3 of Fig. 2.
Figure 4:
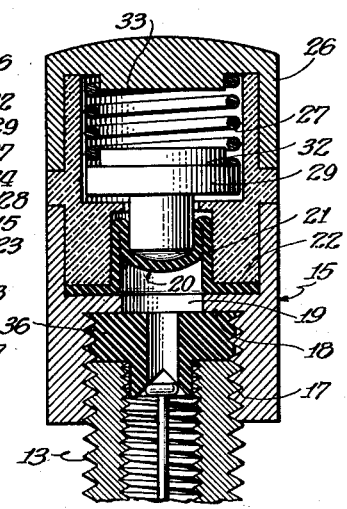
Fig. 4 is a view similar to Fig. 3 but showing a changed position of the parts.

In the chamber 27 is provided a loose fitting slide element 29 having a stem 30 which passes freely through the opening 25 into contact with the crown portion 21 of the diaphragm. The element 29 is constructed of molded opaque plastic material preferably colored. The slide element is provided with a boss portion 32 and the cap member is provided with an internal boss portion 33. Yielding means in the form of a coil spring 34 is positioned in the chamber 27 between the cap member and the slide element over or around said boss portions and tends to move the slide element toward the diaphragm. The stem 30 is of such diameter with respect to the adjacent portion of the transparent sleeve that the crown portion of the diaphragm will readily fold upon itself when the slide element moves toward the tire valve and the opposite side of the diaphragm is subject to the tire air pressure, in which case the parts are substantially as shown in Fig. 3.

In the threaded portion of the sleeve 15 and bearing against the bottom of the ledge 18, I have provided a gasket 36 having an outwardly projecting boss portion 37 and a central opening 38. As shown, the boss portion 37 is provided with a V-shaped groove 39 across its outer face. While I have shown this V-shaped groove 39, it is of course apparent that the passage 38 may open into the valve stem 13 through the side wall of boss portion 37 and the end of this boss portion closed to define means for engaging the pin 40 of the valve. The gasket is constructed of a rubber-like material sufficiently yieldable to provide an air-tight seal between it and the valve stem 13 when the device is tightly screwed on the valve stem, but of such stiffness that its boss portion holds the tire valve open by maintaining the valve pin 40 depressed against the action of the valve spring (not shown).

The sleeves 15 and 23 and the cap member 26, are preferably held together by appropriate cementitious material applied between the parts. A solvent cement, such, for example, as acetate may be used between members 15, 23 and 26 with the result that in effect these members become as one. Due to the yieldability of the gasket 36, this member need not be cemented in as the friction between it and the sleeve threads is ample to hold it in place.

Figure 5:
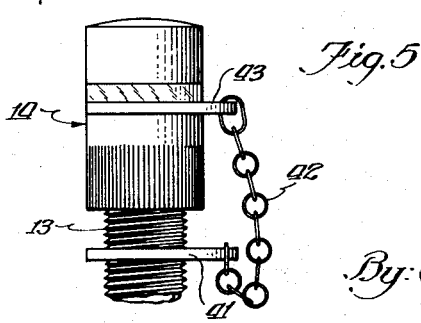
Fig. 5 is a side view on a different scale of my improved device mounted on the valve stem of a tire and having fastening means attached thereto for preventing misplacement or theft of the device.

If desired, protection against loss of the device by misplacement or theft may be obtained by the arrangement shown in Fig. 5, in which a ring 41 surrounds the threaded valve stem and is so deformed that it is very difficult to remove. A chain 42 connects the ring 41 with a ring 43. The ring 43 is rotatably but non-removably mounted on the device between the sleeves 15 and 23.

When my improved device is applied to the valve stem of the tire, the boss portion 37 depresses the valve pin 40 and the air from the tire passes around the valve pin 40, through the openings 38 and 19, and is applied to the adjacent side of the diaphragm. The spring is of such strength that the large portion of the slide element is just above the window 28 and out of sight when the tire pressure is normal, say 30 lbs. When the air pressure in the tire drops appreciably below normal the slide element under pressure of the spring moves toward the tire valve and its position with respect to the window indicates accurately the under inflation of the tire. By employing springs of different strength, the device may be adapted to lower or higher tire pressures.

The height of the crown portion of the diaphragm is such that when the tire pressure is normal the diaphragm is not substantially stretched. Since the crown portion is foldable upon itself in the space between the stem 30 and the adjacent portion of the sleeve 23, the movable portion of the diaphragm offers no appreciable inherent resistance to movement. The diaphragm acts simply as a floating air seal between the tire air pressure on one side and the slide element and spring on the other. The slide element floats freely between the diaphragm and the spring without contacting the sleeve 23. The device is very sensitive, therefore, to changes in pressure within the tire and provides an accurate means of determining quickly when the pressure drops below normal.

I do not intend to limit my invention to the details of construction shown and described except only in so far as certain of the appended claims are specifically so limited as it will be obvious that modifications may be made without departing from the principles of the invention.

I claim:

1. In an arrangement for indicating the air pressure in a pneumatic tire, the combination of a housing, flexible imperforate means in said housing having crown and rim portions and having its rim portion sealed across the housing and dividing it into first and second chambers, the first chamber being adapted to be put into communication with the air chamber of a tire, the crown portion of said flexible means extending into the second chamber, the second chamber having a sight zone, yielding means in the second chamber, and a slide element in the second chamber under the influence of said yielding means and having an indicator, said slide element being slidably movable in the second chamber and having a stem bearing on the outer side of said crown portion, said crown portion folding within itself around the stem of the slide element as the slide element moves toward the first chamber, said crown portion being of such length that it is not substantially stretched when unfolded and the slide element is at the limit of its movement in the opposite direction away from the first chamber.

2. In an arrangement for indicating the air pressure in a pneumatic tire, the combination of a sleeve adapted to be connected with the valve stem of a tire and having an internal perforated ledge, an imperforate flexible diaphragm extending across the sleeve and having crown and rim portions with the rim portion on said ledge, a second sleeve clamping said rim portion against said ledge to provide an air chamber under said diaphragm, a cap member on the second sleeve to provide a second chamber above said diaphragm, said crown portion extending into the second chamber, a slide element slidably movable in the second chamber and having a stem portion bearing on the outer side of said crown portion, yielding means between said slide element and a wall of the second chamber for pressing the stem of said slide element against said crown portion, the second chamber having a sight opening through which movements of the slide element may be observed, said crown portion folding within itself around the stem of the slide element when the latter moves toward the first chamber, said crown portion being of such length that it is not substantially stretched when unfolded and the slide element is at the limit of its movement in the opposite direction away from the first chamber.

3. In an arrangement for indicating the air pressure in a pneumatic tire, the combination of an opaque sleeve adapted to be connected with the valve stem of a tire and having an internal perforated ledge, an imperforate flexible diaphragm extending across the sleeve and having crown and rim portions with the rim portion on said ledge, a second sleeve clamping said rim portion against said ledge to provide an air chamber under said diaphragm, an opaque cap member on the second sleeve to provide a second chamber above said diaphragm, said crown portion extending into the second chamber, a slide element slidably movable in the second chamber and having a stem portion bearing on the outer side of said crown portion, yielding means between said slide element and a wall on the second chamber for pressing the stem of said slide element against said crown portion, said second sleeve having a transparent portion, said opaque sleeve and cap member being separated to provide therebetween with the transparent portion of the second sleeve an encircling closed sight zone through which movements of the slide element may be observed, said crown portion folding within itself around the stem of the slide element when the latter moves toward the first chamber, said crown portion being of such length that it is not substantially stretched when unfolded and the slide element is at the limit of its movement in the opposite direction away from the first chamber.

WILLIAM S. WEST.